(12) United States Patent
Aguilera et al.

(10) Patent No.: US 9,417,938 B2
(45) Date of Patent: Aug. 16, 2016

(54) REMOTE PROCEDURE CALL CHAINS

(75) Inventors: Marcos K. Aguilera, Mountain View, CA (US); Dahlia Malkhi, Palo Alto, CA (US); Ramakrishna R. Kotla, Sunnyvale, CA (US); Yee Jiun Song, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1546 days.

(21) Appl. No.: 12/405,817

(22) Filed: Mar. 17, 2009

(65) Prior Publication Data

US 2010/0242055 A1    Sep. 23, 2010

(51) Int. Cl.
G06F 15/16    (2006.01)
G06F 9/54    (2006.01)
H04L 29/06    (2006.01)

(52) U.S. Cl.
CPC .......... *G06F 9/547* (2013.01); *G06F 2209/509* (2013.01); *H04L 67/40* (2013.01)

(58) Field of Classification Search
CPC .......... H04L 67/40; G06F 9/547; G06F 9/548
USPC ........................................................ 709/201
See application file for complete search history.

(56) References Cited

U.S. PATENT DOCUMENTS

| | | |
|---|---|---|
| 5,404,523 A | 4/1995 | DellaFera et al. |
| 5,475,819 A | 12/1995 | Miller et al. |
| 5,774,479 A * | 6/1998 | Lee et al. ...................... 714/749 |
| 5,970,248 A | 10/1999 | Meier |
| 6,249,822 B1 | 6/2001 | Kays, Jr. et al. |
| 6,446,137 B1 | 9/2002 | Vasudevan et al. |
| 6,874,151 B1 | 3/2005 | Dean |
| 2004/0098478 A1 * | 5/2004 | Koetke et al. ................. 709/224 |
| 2005/0222903 A1 * | 10/2005 | Buchheit et al. ................ 705/14 |
| 2007/0130574 A1 | 6/2007 | Gokhale et al. |
| 2008/0163269 A1 | 7/2008 | Goto |
| 2008/0313660 A1 | 12/2008 | Malik et al. |

OTHER PUBLICATIONS

Alameh, Nadine. Service Chaining of Interoperable Geographic Information Web Services. Global Science & Technology. http://web.mit.edu/nadinesa/www/paper2.pdf. 2002. pp. 1-23.*
Modeling and Testing Aspects of Web Services within the GIG Enterprise Services (GES) Framework. Icosystem. Aug. 24, 2004. pp. 1-86.*

(Continued)

*Primary Examiner* — John MacIlwinen
(74) *Attorney, Agent, or Firm* — John Jardine; Judy Yee; Micky Minhas

(57) ABSTRACT

A remote procedure call chain is provided that replaces multiple consecutive remote procedure calls to multiple servers from a client by allowing a client to specify multiple functions to be performed consecutively at multiple servers in a single remote procedure call chain. The remote procedure call chain is executed by a sequence of multiple servers. Each server executes a service function and a chaining function of the remote procedure call chain. The chaining function uses the state of the remote procedure call chain in the sequence of servers to determine the next server to receive the remote procedure call chain, and the service function to be executed by that server. After the last service function is performed, the last server in the sequence of servers sends the results of the executed service functions to the client that originated the remote procedure call chain.

19 Claims, 9 Drawing Sheets

(56) References Cited

OTHER PUBLICATIONS

"Chaining of Remote Procedure Calls in Distributed Computer Environment". IBM Technical Disclosure Bulletin. Oct. 1993. pp. 1-3.*
Lehmann, Mike, "Developer: Web Services", Retrieved at <<http://www.oracle.com/technology/oramag/oracle/04-mario24dev_web.html?_template=/ocom/print>>, Mar.-Apr. 2004, pp. 5.
"CDE 1.1: Remote Procedure Call", Retrieved at <<http://www.opengroup.org/onlinepubs/9629399/chap6.htm>>, Jan. 27, 2009, pp. 23.
"Amazon Simple Storage Service: Copy Proposal", Retrieved at <<http://doc.s3.amazonaws.com/proposals/copy.html, Jan. 24, 2009, pp. 4.
Aridor, et al., "Infrastructure for Mobile Agents: Requirements and Design", Retrieved at <<http://www.springerlink.com/content/2122764572660756/fulltext.pdf>>, pp. 38-49.
Barbara, et al., "INCAs: Managing Dynamic Workflows in Distributed Environments", Retrieved at http://citeseer.ist.psu.edu/rd/45203622%2C146645%2C1%2C0.25%2CDownload/http://citeseer.ist.psu.edu/cache/papers/cs/3193/http:zSzzSzwww.buva.sowi.uni-bamberg.dezSzps-SammlungzSzliteraturzSzworkflowUnterlagenzSzvortelzSzbarbara.pdf/barbara96incas.pdf>>, Sep. 6, 1995, pp. 1-29.
Blumofe, et al., "Cilk: An Efficient Multithreaded Runtime System", Retrieved at <<http://supertech.csail.mit.edu/papers/cilkjpdc96.pdf>>, Oct. 17, 1996, pp. 1-26.
Dean, et al., "MapReduce: Simplified Data Processing on Large Clusters", Retrieved at <<http://labs.google.com/papers/mapreduce-osdi04.pdf, OSDI 2004, pp. 1-13.
Freedman, et al., "Non-Transitive Connectivity and DHTs", Retrieved at <<http://www.srhea.net/papers/ntr-worlds05.pdf, Proceedings of the Second Workshop on Real, Large Distributed Systems, WORLDS 2005, pp. 1-6.
Gray, et al., "Mobile Agents: The Next Generation in Distributed Computing", Retrieved at <<http://ieeexplore.ieee.org/stamp/stamp.jsp?arnumber=00581620>>, IEEE Explore, Jan. 24, 2009, pp. 8-24.
Chess, et al., "Mobile Agents: Are they a Good Idea?", Retrieved at http://www.springerlink.com/content/q35p7w6mm34q208q/fulltext.pdf>>, pp. 25-45.
Huston, et al., "Diamond: A Storage Architecture for Early Discard in Interactive Search", Retrieved at <<http://www.pdl.cmu.edu/PDL-FTP/Database/diamond-fast04.pdf>>, Proceedings of the 3rd USENIX Conference on File and Storage Technologies, FAST 2004, Mar. 31, 2004, pp. 14.
Jagannathan, Suresh, "Continuation-based Transformations for Coordination Languages", Retrieved at <<http://citeseer.ist.psu.edu/rd/45203622%2C258396%2C1%2C0.25%2CDownload/http://citeseer.ist.psu.edu/cache/papers/cs/11624/http:zSzzSzwww.neci.nj.nec.comzSzhomepageszSzjagannathanzSzpaperszSztcs99.pdf/agannathan99continuationbased.pdf>>, In the Proceedings of the 1997 International Conference on Coordination Models and Languages, pp. 26.
Moreau, Luc, "The Pcks-Machine: An Abstract Machine for Sound Evaluation of Parallel Functional Programs with First-Class Continuations", Retrieved at http://citeseerx.ist.psu.edu/viewdoc/download?doi=10.1.1.108.5007&rep=rep1&type=pdf>>, In the Proceedings of European Symposium on Programming (ESOP'94), Apr. 1994, pp. 1-16.
Ratnasamy, et al., "A Scalable Content-Addressable Network", Retrieved at <<http://www.cs.cornell.edu/People/francis/p13-ratnasamy.pdf>>, SIGCOMM'01, Aug. 27-31, 2001, San Diego, California, USA, pp. 161-172.
Rowstron, et al., "Pastry: Scalable, Decentralized Object Location, and Routing for Large-Scale Peer-to-Peer Systems", Retrieved at <<http://research.microsoft.com/en-us/um/people/antr/past/pastry.pdf>>, Appears in Proc. of the 18th IFIP/ACM International Conference on Distributed Systems Platforms, Middleware 2001, Heidelberg, Germany, Nov. 2001, pp. 22.
Stoica, et al., "Chord: A Scalable Peer-to-Peer Lookup Service for Internet Applications", Retrieved at http://pdos.csail.mit.edu/papers/chord:sigcomm01/chord_sigcomm.pdf>>, SIGCOMM'01, Aug. 27-31, 2001, San Diego, California, USA, pp. 1-12.
Strachey, et al., "Continuations: A Mathematical Semantics for Handling Full Jumps", Retrieved at <<http://www.springerlink.com/content/q0xv4n463623rm84/fulltext.pdf>>, Higher-Order and Symbolic Computation, 13, 2000, pp. 135-152.
Tennenhouse, et al., "A Survey of Active Network Research", Retrieved at <<http://www-rp.lip6.fr/maitrise/articles/ieeecomms97.pdf>>, pp. 1-14.
White, Jim, "Mobile Agents White Paper", Retrieved at <<http://citeseerx.ist.psu.edu/viewdoc/summary?doi=10.1.1.55.7931.>>, 1996, pp. 30.
"World Wide Web Consortium", Retrieved at <<http://www.w3.org/>>, Jan. 27, 2009, pp. 5.
Yu, et al., "Continuation-Passing Enactment of Distributed Recoverable Workflows", Retrieved at <<http://portal.acm.org/ft_gateway.cfm?id=1244114&type=pdf&coll=GUIDE&dl=GUIDE&CFID=19475818&CFTOKEN=53796140>>, SAC'07, Mar. 11-15, 2007, Seoul, Korea, pp. 475-481.
Yu, et al., "DryadLINQ: A System for General-Purpose Distributed Data-Parallel Computing using a High-Level Language", Retrieved at <<http://research.microsoft.com/en-us/projects/dryadlinq/dryadlinq.pdf>>, pp. 1-14.
Zhao, et al., "Tapestry: A Resilient Global-Scale Overlay for Service Deployment", Retrieved at <<http://bnrg.cs.berkeley.edu/~adj/publications/paper-files/tapestry_jsac.pdf>>, IEEE Journal on Selected Areas in Communications, vol. 22, No. 1, Jan. 2004, pp. 1-15.

* cited by examiner

US 9,417,938 B2

REMOTE PROCEDURE CALL CHAINS

BACKGROUND

Many complex distributed applications are built from remote services, such as storage services, database management systems, authentication and configuration services, and services for interfacing with external components (e.g., credit card processing, banking, vendors, etc). These services are frequently invoked via remote procedure calls or equivalent mechanisms (e.g., remote method invocations). It is common for an application to perform multiple remote procedure calls to accomplish a task, such as accessing data. For example, the application may call a configuration service using one remote procedure call to obtain the name of servers providing authentication services and database services. The application may then call an authentication service at a named server using a second remote procedure call to obtain credentials to access the data. Finally, the application may call a database service at a named server using a third remote procedure call to access the data.

Each local server providing a service may be in a separate machine, rack, room, or site. As servers become more complex and ubiquitous, the geographical dispersion increases. As a result, the communication costs of multiple remote procedure calls in succession can be significant, in terms of latency which causes application delays, and bandwidth which could be limited.

FIG. 1 is an illustration of a prior art system 100 using remote procedure calls. The system 100 may include a client A executing a variety of applications such as an email application, for example. The system 100 may further include a plurality of servers (e.g., servers B, C, D, E, and F). The servers B-F may be adapted to receive and execute remote procedure calls generated from the application executing on the client A. As illustrated by the dashed lines, the client A may be located at a site 1, the servers B, E, and F may be located at a site 2, and the servers C and D may be located at a site 3.

As part of executing the email application, the client A may make three remote procedure calls. As illustrated, the email application executing at the client A makes a remote procedure call (101) to the server B. For example, the server B may be a server that is responsible for authenticating a user of the email application executing on client A. As part of the execution of the remote procedure call for authenticating the user, the server B may further make a remote procedure call (102) to the server C. The server C may execute the remote procedure call and provide a result of the remote procedure call to the server B (103). The server B may receive the result, and use the result to make a further remote procedure call (104) to the server D. The server D may execute the remote procedure call and provide a result of the remote procedure call to the server B (105). For example, the result may be an authentication token.

The server B may then provide the result of the remote procedure call to the client A (106). Upon receiving the result, the email application executing at the client A may make a second remote procedure call (107) to the server E using the result received from the server B. For example, the server E may be a database server that stores email messages, and may require the authentication token that was provided to the client A from the server B in order to retrieve email messages for the email application executing on the client A. The server E may execute the remote procedure call and provide a result of the remote procedure call to the client A (108). For example, the result may be email messages received by the user of the email application executing on the client A.

Finally, the client A may make a third remote procedure call (109) to the server F using the result provided by the server E. For example, the server F may be an advertisement server that provides advertisements to display in the email application based on the content of the emails received by the user. The server F may execute the remote procedure call and provide a result of the remote procedure call to the client A (110). For example, the result may be set of advertisements to display in the email application. Upon receiving the results from the three remote procedure calls to the servers B, E, and F, the email application executing on the client A may present the email messages and advertisements to the authenticated user at the client A.

As illustrated, the use of conventional remote procedure calls to implement the email application illustrated above creates several inefficiencies and creates several opportunities for failures in the system 100. For example, there were six communications sent and received between client A and servers B, E, and F, and four communications between server B and servers C and D. Each communication sent and received has an associated transmission time and may be lost or delayed due to network congestion or failure. Moreover, all ten communications crossed between sites, even though servers C and D, and servers B, E, and F, were located at the same site. Intrasite communications may have an even larger transmission time than intersite communications, and may be even more susceptible to network congestion or network failure.

SUMMARY

A remote procedure call chain is provided that replaces multiple consecutive remote procedure calls to multiple servers from a client by allowing a client to specify multiple functions to be performed consecutively at multiple servers in a single remote procedure call chain. The remote procedure call chain is executed by a sequence of multiple servers. Each server executes a service function and a chaining function of the remote procedure call chain. The chaining function uses the state of the remote procedure call chain in the sequence of servers to determine the next server to receive the remote procedure call chain, and the service function to be executed by that server. After the last service function is performed, the last server in the sequence of servers sends the results of the executed service functions to the client that originated the remote procedure call chain.

In an implementation, a first chaining instruction, a first service function, state information and parameters for the first service function are received at a first computing device. Results of the first service function are generated at the first computing device using the first service function and the parameters for the first service function. A second service function, second chaining function, parameters for the second service function, new state information, and an identifier of a second computing device are generated at the first computing device using the first chaining function, state information, and the results of the first service function. The second service function, the second chaining function, the parameters for the second service function, the new state information, and the results of the first service function are transmitted from the first computing device to the second computing device. The second service function, the second chaining function, the parameters for the second service function, the new state information, and the results of the first service function are received at the second computing device. Results of the second service function are generated at the second computing device using the second service function and the parameters for the second service function. An identifier of a third computing device is generated at the second computing device using the second chaining function and the new state information. The results of the second service function are transmitted from the second computing device to the identified third computing device.

In an implementation, the first service function, first chaining function, and the parameters of the first service function may have been transmitted by the third computing device. The first chaining function may be an identifier of the first chaining function. The second and third computing devices may be the same computing devices. The first service function may be stored at the first computing device. An exception may be received at the third computing device, and in response to receiving the exception, the first service function, first chaining function, and the parameters of the first service function may be re-transmitted. A determination may be made as to whether a threshold amount of time has been exceeded since the first service function, first chaining function, and the parameters of the first service function were transmitted. If the threshold amount of time has been exceeded, the first service function, first chaining function, and the parameters of the first service function may be re-transmitted.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
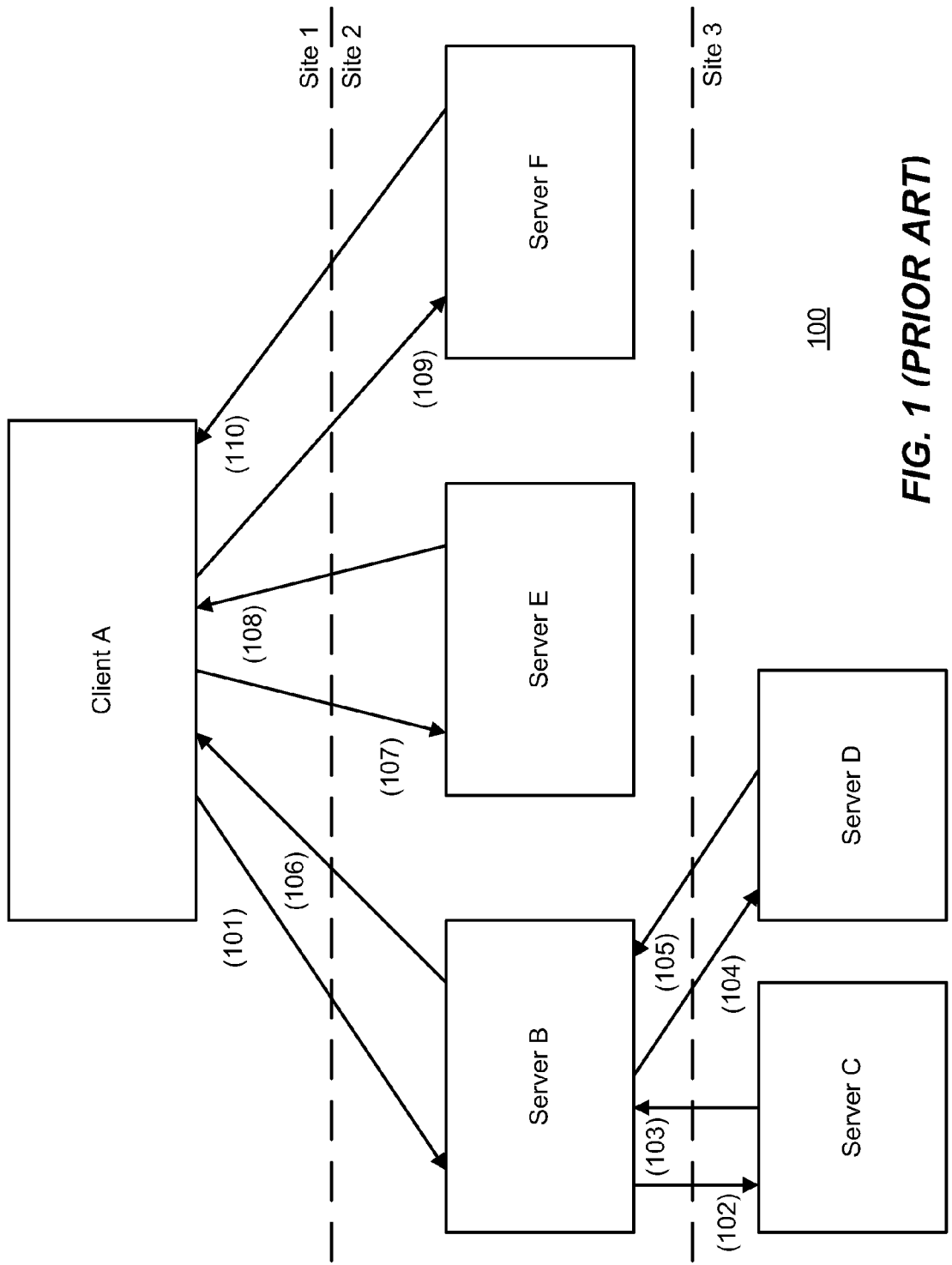
FIG. 1 is an illustration of a prior art system using conventional remote procedure calls.
Figure 2:
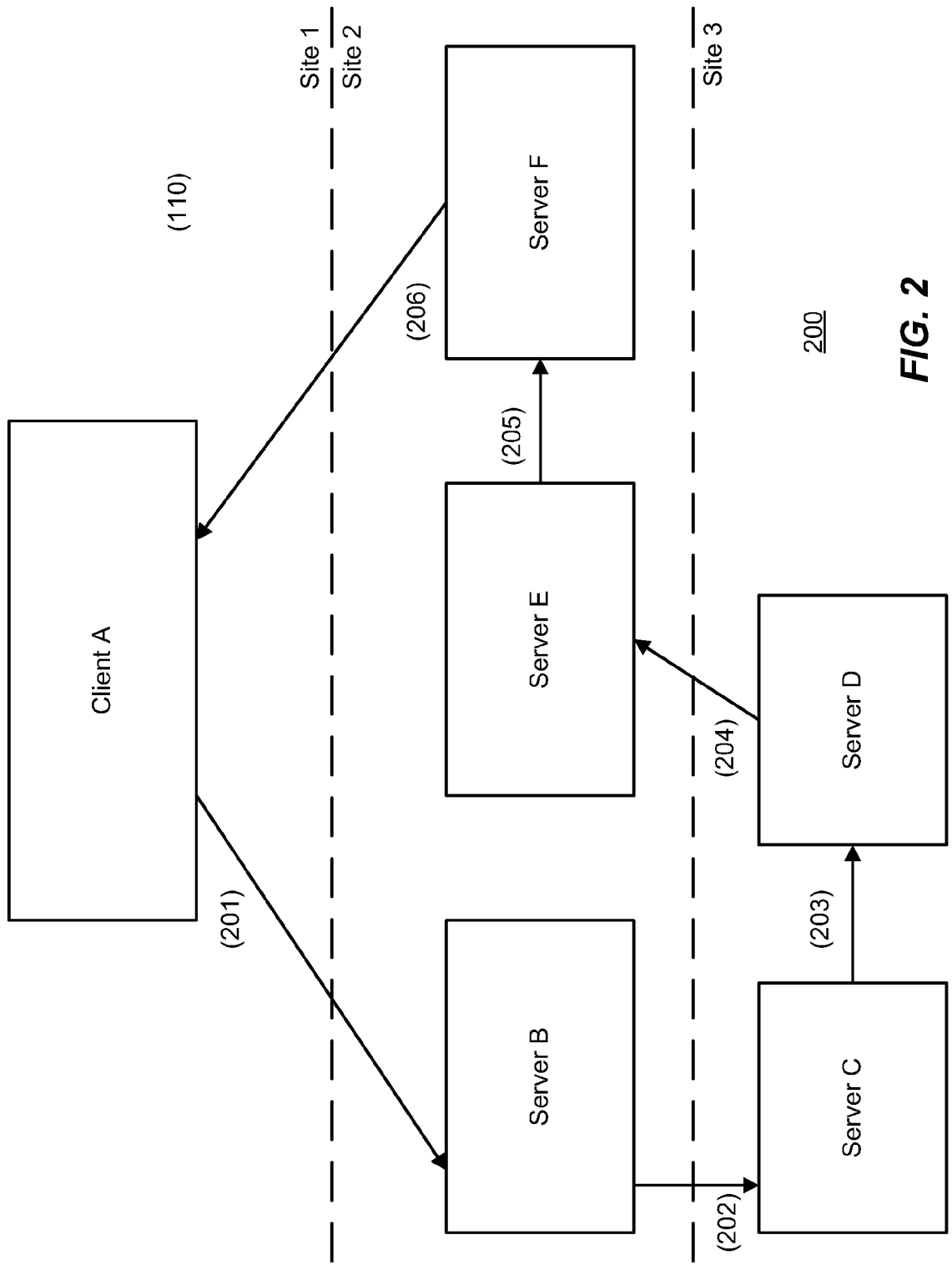
FIG. 2 is an illustration of a system using remote procedure call chains.

FIG. 2 is a block diagram of a system 200 using remote procedure call chains. The illustrated system 200 is similar to the system 100 illustrated in FIG. 1, but uses remote procedure call chains described further herein rather than conventional remote procedure calls. A remote procedure call chain (RPCC) is similar to a remote procedure call, but instead of specifying a single remote server and function in the remote procedure call, a succession of remote servers and functions may be specified. Each remote server specified in a remote procedure call chain may execute a specified function in the remote procedure call chain, and then may transmit the result and a request to continue the remote procedure call chain to the next specified remote server who in turn may execute a specified function of the remote procedure call chain and may further transmit the result and a request to continue the remote procedure call chain to the next specified server. The last specified server in the remote procedure call chain may then transmit the final results to the client, server, or other computing device that originated the remote procedure call chain. The results may include one or more of the results generated by the servers in the remote procedure call chain.

By specifying multiple remote servers and functions in the remote procedure call chain, many of the communications illustrated in FIG. 1 are avoided resulting in a reduction in overall transmission times. Moreover, remote procedure call chains may further reduce the number of intersite communications, thus further reducing overall communication times and communication bandwidth as well as potential failures due to network congestion or other networking issues.

In an implementation, to facilitate the execution of an email application for example, the client A may transmit a single request for a remote procedure call chain to the server B (201). In some implementations, the remote procedure call chain may indicate the functions that each server is to execute, as well as the sequence of the servers that are to execute the identified functions. The server B may authenticate the user of the client A using servers C and D. The server B may execute an identified function in the remote procedure call chain and transmit the result and a request to continue the remote procedure call chain to the server C (202). The server C may execute an identified function in the remote procedure call chain and transmit the result and a request to continue the remote procedure call chain to the server D (203). The server D may execute an identified function in the remote procedure call chain and transmit the result and a request to continue the remote procedure call chain to the server E (204). For example, the result may include the authentication token described in FIG. 1.

The server E may receive the result and the request to continue the remote procedure call chain, execute an identified function in the remote procedure call chain, and transmit the result and a request to continue the remote procedure call chain to the server F (205). The result may include the authentication token received from the server D, as well as email messages retrieved by the server E using the authentication token.

The server F may receive the result and the request to continue the remote procedure call chain, execute an identified function in the remote procedure call chain, and transmit the result to the client A (206). The result may include the authentication token, email messages, and one or more advertisements generated by the server F using the text of the email messages. The client A may then use the received results in the email application executing at the client A.

In FIG. 2, only two communications are sent and received by the client A, in contrast with the six communications that are sent and received by the client A in FIG. 1. By not receiving and sending as many communications, the amount of computing and network resources used by the client A is reduced. Intrasite communications are also reduced to four in FIG. 2, down from ten in FIG. 1. Because intrasite communications typically take much longer than intersite communications and are more susceptible to network congestion or failures, reducing the amount of intrasite communications can improve the responsiveness and overall speed of the application executing at client A.

Figure 3:
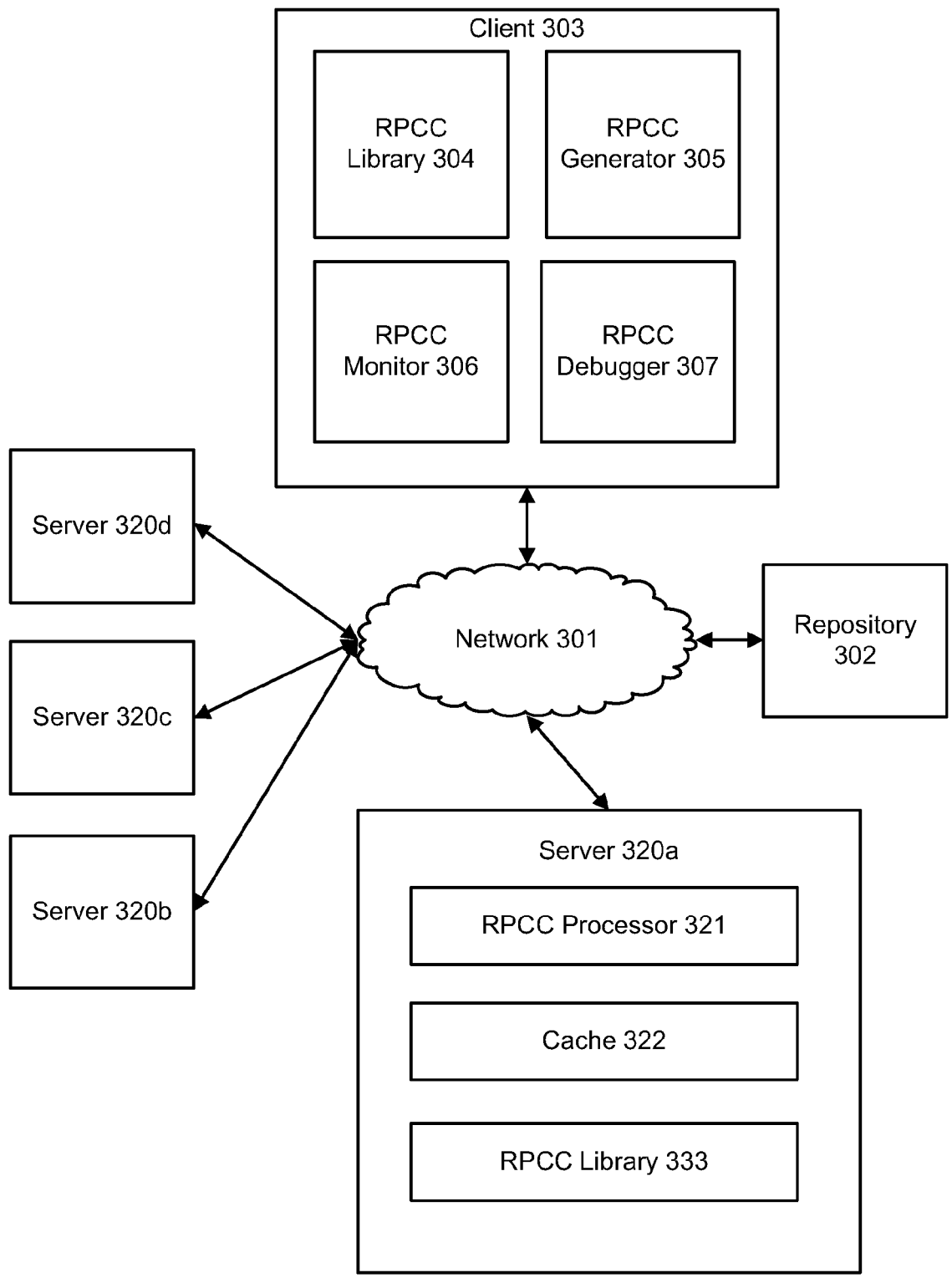
FIG. 3 is an illustration of a system for using remote procedure call chains.

FIG. 3 is an illustration of a system 300 for using remote procedure call chains. The system 300 may include a client 303 in communication with a plurality of servers (e.g., servers 320a, 320b, 320c, and 320d), and a repository 302 through a network 301. The network 301 may be a variety of network types including the public switched telephone network (PSTN), a cellular telephone network, and a packet switched network (e.g., the Internet). While only the components of the server 320a are shown in FIG. 3, it is for illustrative purposes only. Each of servers 320b, 320c, and 320d may have components similar to those shown in the server 320a.

As used in the present application, the term "function" is defined to be the entire description of a procedure or an identifier or name of such procedure.

The client 303 may include a remote procedure call chain generator 305. The remote procedure call chain generator 305 may generate remote procedure call chains using one or more functions, routines, and data structures available in a remote procedure call chain library 304.

The remote procedure call chain may include chaining instructions. In a simple case, the chaining instructions may be a list of servers to receive and execute the remote procedure call chain. The chaining instructions may also take the form of a chaining function that among other things may return an indicator of a new computing device to execute part of the remote procedure call chain when executed. Chaining functions are described further below.

In some implementations, the remote procedure call chain generator 305 may generate a remote procedure call chain by generating a chaining function (or an identifier of a chaining function), a service function (or an identifier of a service function), and one or more parameters. In some implementations, the remote procedure call chain generator 305 may generate a unique identifier (e.g., a number) for the generated remote procedure call chain. As will be discussed further below, the generated unique identifier may be used by a remote procedure call chain monitor 306 to determine if the remote procedure call chain has been executed successfully.

The service function may be a function that when executed by a server (e.g., one of servers 320a-320d) causes the server to perform a particular service. For example, if the client 303 wants the server 320a to store a particular file, the service function may be a function that when executed by the server 320a causes the server 320a to store the file.

The service function may take one or more parameters as an input. For example, the parameters may indicate the particular file that is to be stored by the server 320a. The parameters may include parameters initially specified by the remote procedure call chain generator 305, and may further include additional values and results later generated during the execution of the remote procedure call chain. For example, if a remote procedure call chain is first executed by the server 320a causing a file to be retrieved, and is then later executed by the server 320b causing advertisements to be retrieved based on the file, then the parameters may include the advertisements and/or the contents of the retrieved file.

The chaining function may be a function that when executed by a server (e.g., the server 320a) causes the server to generate an identifier of the next computing device (e.g., one of servers 320b-d) to receive the remote procedure call chain. The chaining function may take as an input one or more of the parameters associated with the remote procedure call chain or results of a service function. The parameters may include state information. The chaining function may then use the state information and/or the results of the service function to determine what computing device should receive the remote procedure call chain next.

The chaining function, when executed by a server, may further cause the server to generate a new service function, a new chaining function, parameters for the new service function, and new state information. The chaining function may generate the new service function, chaining function, parameters for the new service function, and new state information using the state information included in its parameters and/or using the results of the service function. The new service, new chaining function, parameters for the new service function, and new state information may then be transmitted to the identified next computing device as part of the remote procedure call chain. For example, the server 320a, as part of executing a remote procedure call chain, may have executed a service function that resulted in a particular file being retrieved. The server 320a may then execute the chaining function resulting in an identifier of the server 320c, a next service function, parameters for the next service function, and new state information. The next service function may cause the server 320c to perform an operation on the retrieved file, for example.

In some implementations, the state information may be a variable included in the parameters of the chaining function. For example, the chaining function may determine the state of the remote procedure call chain by referencing the state variable included in the parameters of the chaining function. Sometime before or after generating the identifier of the next service function, the identifier of the next chaining function, the parameters for the next service function, and the identifier of the next computing device, the chaining function may also generate new state information.

In another implementation, the chaining function may generate the new state information based on the results or the output of the service function. For example, where a remote procedure call chain is generated to retrieve a file and generate a set of advertisements based on the file, the chaining function may generate the new state information by determining if the retrieved file or set of advertisements are attached.

In some implementations, the chaining function may dynamically determine an identifier of the next computing device, a next chaining function, a next service function, new state information, and the parameters for the next service function based on the output of the service function. For example, where a service function retrieves a particular file, the chaining function may determine the next computing device, chaining function, and service function, parameters for the service function, and new state information for the remote procedure call chain dynamically based on the contents of the retrieved file.

The client 303 may transmit a request for the remote procedure call chain generated by the remote procedure call chain generator 305 to one of the servers 320a-d to be executed by that server. The request for the remote procedure call chain may be transmitted through the network 301. For example, in some implementations, the client 303 may transmit the service function, code of the chaining function, and copies of the parameters to the server 320a. In other implementations, rather than transmit code of the chaining function, the client 303 may first store the code of the chaining function in the repository 302. The client 303 may then transmit an identifier (e.g., pointer) of the chaining function to the server 320*a*. The server 320*a* may then retrieve the code of the chaining function from the repository 302.

A server such as the server 320*a* may receive the request for the remote procedure call chain from the client 303 (or one of the servers 320*b-d*) and execute the service and chaining function of the remote procedure call chain in a remote procedure call chain processor 321. In some implementations, the remote procedure call chain processor 321 is "sandboxed" or otherwise kept separate from other processing components of the server 320*a*. Sandboxing the remote procedure call chain processor 321 may prevent malicious or poorly designed remote procedure call chains from crashing the server 320*a* or interfering with the execution of other processes on the server 320*a*.

In some implementations, the code of the chaining function is received (or retrieved from the repository 302) in an executable form. For example, the code of the chaining function may have been precompiled for execution by the remote procedure call chain processor 321. In other implementations, the code of the chaining function is source code and is first compiled by the remote procedure call chain processor 321 using a remote procedure call chain library 333. The remote procedure call chain library 333 may contain substantially the same functions, routines, and data structures as the remote procedure call chain library 304. By compiling the chaining function at the servers 320*a-d*, the particular configuration or architecture of each of the servers 320*a-d* does not need to be known by the client 303 when generating the remote procedure call chain.

The remote procedure call chain processor 321 may execute the remote procedure call chain by executing the service function. In some implementations, the service function may be executed by the remote procedure call chain processor 321 with one or more of the parameters. The parameters may include variables, results received from the execution of the remote procedure call chain at previous computing devices, and parameters generated by a chaining function, including possibly parameters that are generated using state information.

The remote procedure call chain processor 321 may generate one or more results upon execution of a service function. In some implementations, the remote procedure call chain processor 321 may append or attach the generated results to the parameters associated with the remote procedure call chain. In other implementations, the remote procedure call chain processor 321 may replace the parameters with the generated results.

Additionally, the remote procedure call chain processor 321 may store the generated results in a cache 322. The generated results may be stored in the cache 322 along with the unique identifier of the remote procedure call chain so that, in the event of an error or exception generated at a later stage of the remote procedure call chain execution, the remote procedure call chain processor 321 may retrieve the generated results rather than re-execute the service functions upon subsequent receipt of the same remote procedure call chain.

The remote procedure call chain processor 321 may further execute the remote procedure call chain by executing a chaining function. In some implementations, the chaining function may be executed by the remote procedure call chain processor 321 with one or more of the parameters or results of a service function. For example, the chaining function may be executed using results generated by the service function or using state information included in the parameters.

In some implementations, the remote call chain processor 321 may execute the chaining function to generate an identifier of a computing device. The computing device may be another server (e.g., the servers 320*b-d*), or in the case where the remote procedure call chain is completed, the computing device may be the client 303. The server 320*a* may send a request to continue the remote procedure call chain to the identified computing device.

In some implementations, the remote call chain processor 321 may further execute the chaining function to generate a new service function. The new service function of the remote procedure call chain may be executed by the identified computing device. The remote call chain processor 321 may further generate parameters for the new service function.

In some implementations, the remote procedure call chain processor 321 may further execute the chaining function to generate a new chaining function. The new chaining function of the remote procedure call chain may be executed by the identified computing device. The remote procedure call chain processor 321 may further generate new state information.

In some implementations, the remote call chain processor 321 may further generate debugging information during the processing of the remote procedure call chain. The debugging information generated by the remote procedure call chain may have been specified by the client 303 as a parameter associated with the generated remote procedure call chain. The remote procedure call chain processor 321 may append or attach the generated debugging information to the parameters of the remote procedure call chain, for example.

In some implementations, the remote call chain processor 321 may further generate one or more exceptions during the execution of the remote procedure call chain. For example, the remote procedure call chain processor 321 may be unable to complete the execution of the service function or chaining function or may otherwise encounter an error. The generated exception and the unique identifier associated with the remote procedure call chain may be transmitted to the client 303.

The client 303 may further include a remote procedure call chain monitor 306. The remote procedure call monitor 306 may determine if a transmitted remote procedure call chain has been executed in a timely manner, and if not, re-transmit the remote procedure call chain or alert a user or administrator. In some implementations, the remote procedure call chain monitor 306 may monitor the amount of time since a request for a remote procedure call chain was transmitted, and if the amount of time is greater than a threshold amount of time, re-transmit the request for a remote procedure call chain. The threshold amount of time chosen may be dependent on a variety of factors including network latency, the number of servers that will execute the remote procedure call chain, and the speed of the servers, for example. Other factors may also be considered.

In some implementations, the remote procedure call chain monitor 306 may receive one or more exceptions from a server (e.g., one of the servers 320*a-d*). An exception may include the unique identifier of a remote procedure call chain and may indicate the error that occurred during the processing of the remote procedure call chain. The remote procedure call monitor 306 may then re-transmit the request for a remote procedure call chain identified by the unique identifier and/or report the error to the user at the client device 303, for example.

The client 303 may further include a remote procedure call chain debugger 307. As described above, the parameters or results associated with a remote procedure call chain may include debugging information generated by the remote procedure call chain processors 321 at the servers 320*a-d* that executed the remote procedure call chain. The remote procedure call chain debugger 307 may extract the debugging information from the received parameters and/or results and present the debugging information to a user or an administrator at the client device 303. Further, the debugger 307 may specify particular debugging information that is generated and/or collected by the remote call chain processors 321 during the execution of the remote procedure call chain. The specified debugging information may be included in the generated parameters and by the remote procedure call chain generator 305, for example.

Figure 4:
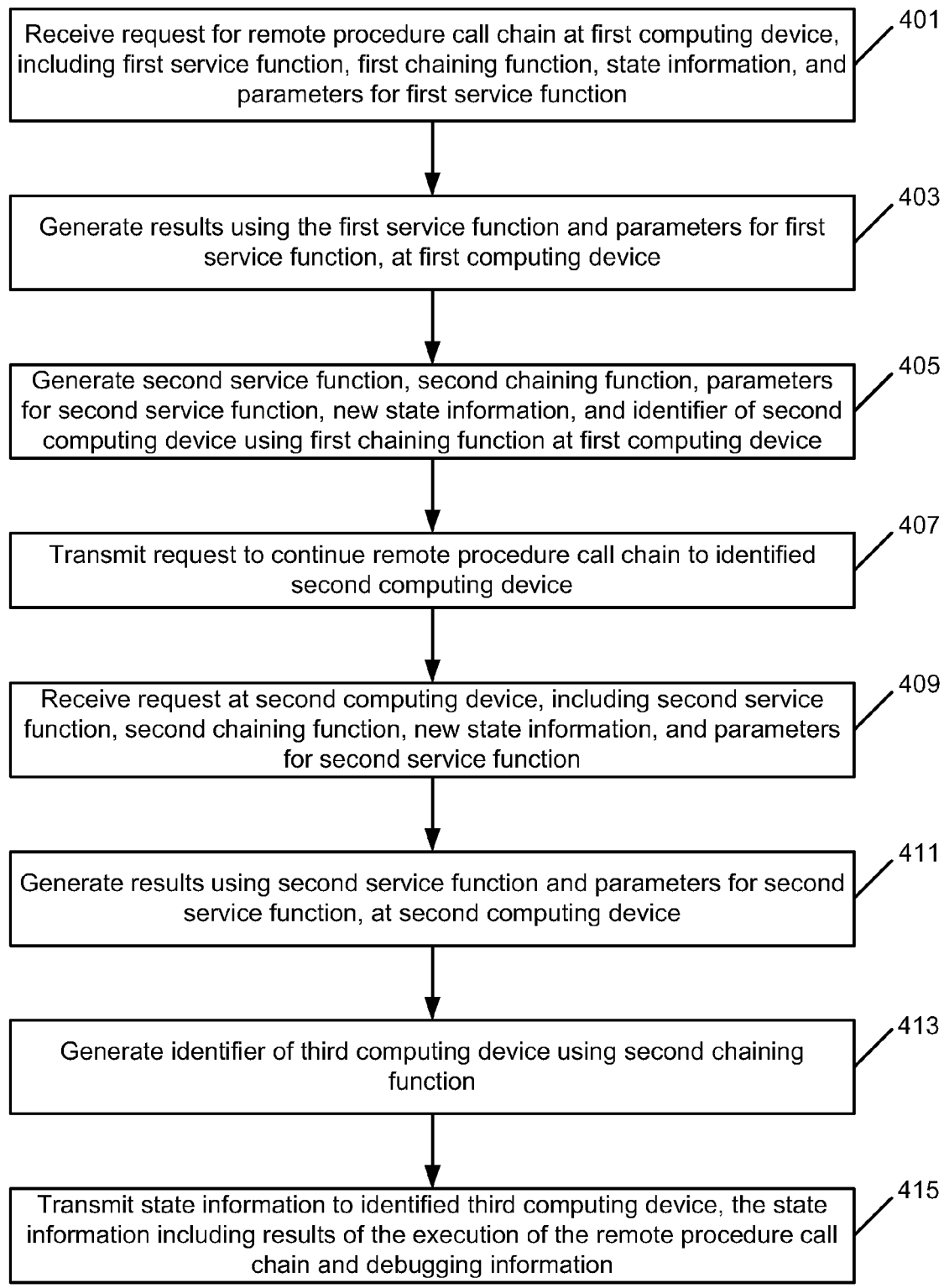
FIG. 4 is an operational flow of an example method for using a remote procedure call chain.

FIG. 4 is an operational flow of an example method 400 for using a remote procedure call chain. The method 400 may be implemented by one or more servers such as the servers 320a-d illustrated in FIG. 3, for example.

A request for a remote procedure call chain may be received at a first computing device (401). The request for a remote procedure call chain may be received by a first computing device such as the server 320a from a client 303, for example. The request for a remote procedure call chain may include a first service function, a first chaining function, parameters for the first service function, and state information. The first computing device may retrieve the code of the first chaining function from a repository such as the repository 302, or alternatively, the first computing device may retrieve the code of the chaining function from a local cache such as the cache 322. The parameters for the first service function may include arguments for the first service function. The parameters for the first chaining function may include state information and debugging information, for example. In some implementations, chaining instructions, other than chaining functions may be used.

Results may be generated using the first service function and the parameters for the first service function by the first computing device (403). The results may be generated by the remote procedure call chain processor 321 by executing the first service function using one or more arguments from the parameters for the first service function. The generated results may include a result from the execution of the first service function, and debugging information generated during the execution of the first service function, for example.

A second computing device, a second service function, a second chaining function, parameters for the second service function, and new state information may be generated using the first chaining function at the first computing device (405). The second service function, the second chaining function, parameters for the second service function, and new state information may be generated by the remote procedure call chain processor 321 executing the first chaining function, for example. The second service function, second chaining function, the parameters for the second service function, and new state information may be transmitted with the request to continue the remote procedure call chain to the identified second computing device.

The request to continue the remote procedure call chain may be transmitted to the identified second computing device (407). The remote procedure call chain may be transmitted by the first computing device to the identified second computing device.

The request to continue the remote procedure call chain may be received at the identified second computing device (409). The second computing device may be a computing device such as the server 320b, for example. As described above, the request to continue the remote procedure call chain may include the second service function, the second chaining function, parameters for the second service function, and new state information. The second computing device may retrieve the code for the second chaining function from a repository such as the repository 302, or alternatively, the second computing device may retrieve the identified chaining function from a local cache such as the cache 322.

Results may be generated using the second service function and the parameters for the second service function by the second computing device (411). The results may be generated by the remote procedure call chain processor 321 by executing the second service function using one or more arguments from the parameters for the second service function, for example.

An identifier of a third computing device may be generated using the second chaining function at the second computing device using the new state information (413). The identifier may be generated by the remote procedure call chain processor 321, for example. The identified third computing device may be a computing device that transmitted the original request for the remote procedure call chain to the first computing device (i.e., the client 303). New state information and debugging information may also be generated using the second chaining function. The new state information may include or depend on the results generated using the second service function.

The state information may be transmitted to the identified third computing device (415). The state information may include results of the execution of the remote procedure call chain, along with the generated debugging information.

Figure 5:
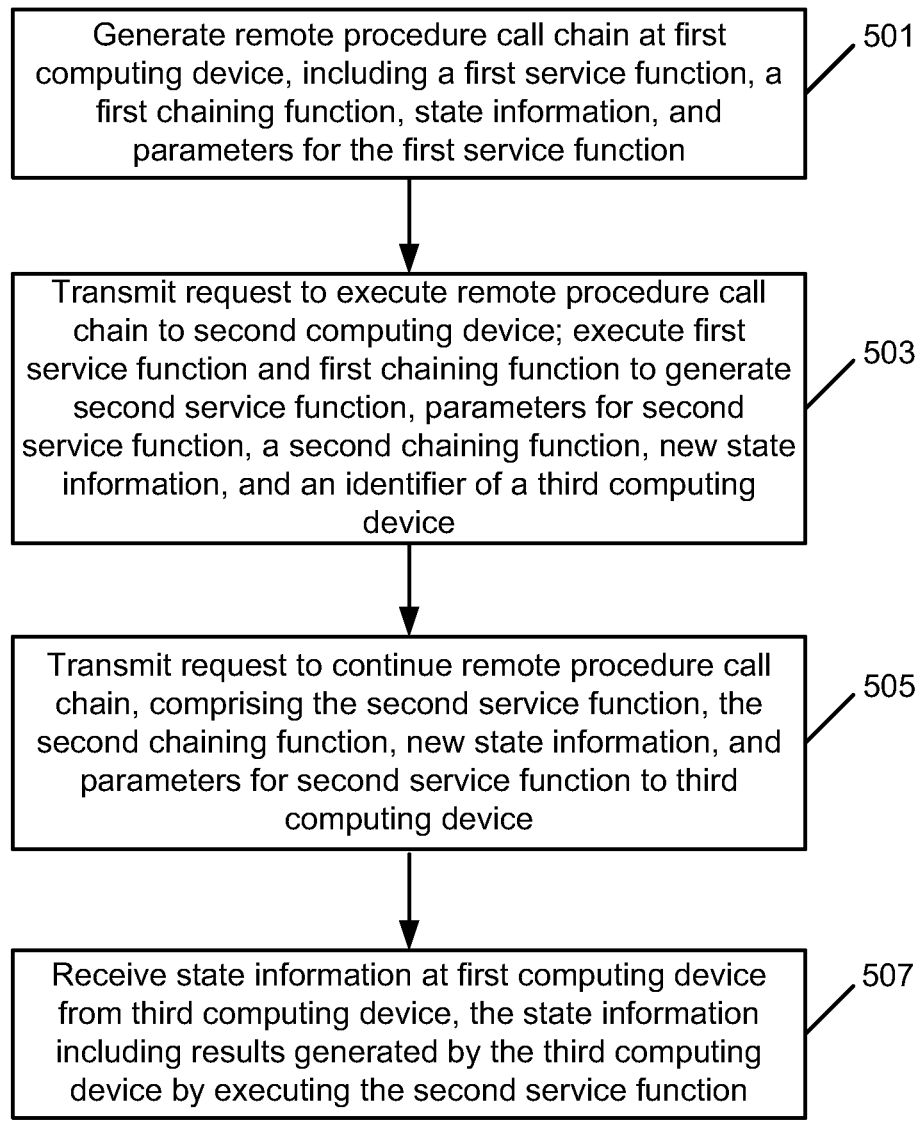
FIG. 5 is an operational flow of another example method for using a remote procedure call chain.

FIG. 5 is an operational flow of another example method 500 for using a remote procedure call chain. The method 500 may be implemented using one or more clients 303 and one or more servers 320a-d, for example.

A remote procedure call chain may be generated at a first computing device (501). The remote procedure call chain may be generated by a remote procedure call chain generator 305 at a computing device such as the client 303.

The generated remote procedure call chain may include a first service function, a generated first chaining function, generated parameters for the first service function, and state information. The remote procedure call chain generator 305 may generate the first chaining function using a remote procedure call chaining function API or library, such as the remote procedure call chain library 304.

The first service function may be a function that when executed by a second computing device using the parameters for the first service function, results in the generation of results. For example, where the second computing device is a file server, the parameters may include a file name, and the first service function may be a function that when executed by the second computing device causes the second computing device to retrieve the file specified by the first parameters. The contents of the retrieved file may be part of the generated results.

The generated first chaining function may be a function that when executed by the second computing device using the state information, results in the generation of a second service function, a second chaining function, parameters for the second service function, new state information, and an identifier of a third computing device. For example, the second computing device may execute the first chaining function with the results generated by the service function and state information. The generated results and state information may indicate to the chaining function that the file was successfully retrieved. The execution of the first chaining function may result in an identifier of a third computing device that is an advertisement server, a second service function that when executed by the advertisement server causes the advertisement server to generate a set of advertisements based on the content of the retrieved file, a second chaining function, and new state information.

A request to execute the remote procedure call chain may be transmitted to the second computing device (503). The remote procedure call chain may be transmitted by the client 303 to the server 320a, for example. Upon receipt of the request to execute the remote procedure call chain, the first service function and the first chaining function may be executed by a remote procedure call chain processor 321, resulting in the generation a second service function, results of the first service function, a second chaining function, parameters for the second service function, an identifier of a third computing device, and new state information. The second service function, the second chaining function, parameters for the second service function, and new state information may then be transmitted to the identified third computing device (505). For example, the third computing device may be the server 320b.

In some implementations, the third computing device may be the same as the second computing device. For example, the first and second service functions may be both executed at the second computing device.

State information may be received at the first computing device from the third computing device (507). As described above, the first computing device may be the client device 303 that generated and transmitted the request for a remote procedure call chain. The state information may include results generated by the third computing device by executing the second service function and second chaining function. For example, continuing the example described above, the third server may have been an advertisement server and executing the second service function may have resulted in a set of advertisements being generated based on the file included in the parameters for the second service function. The third computing device may then have executed the second chaining function, causing the set of advertisements being included as part of the new state information.

Figure 6:
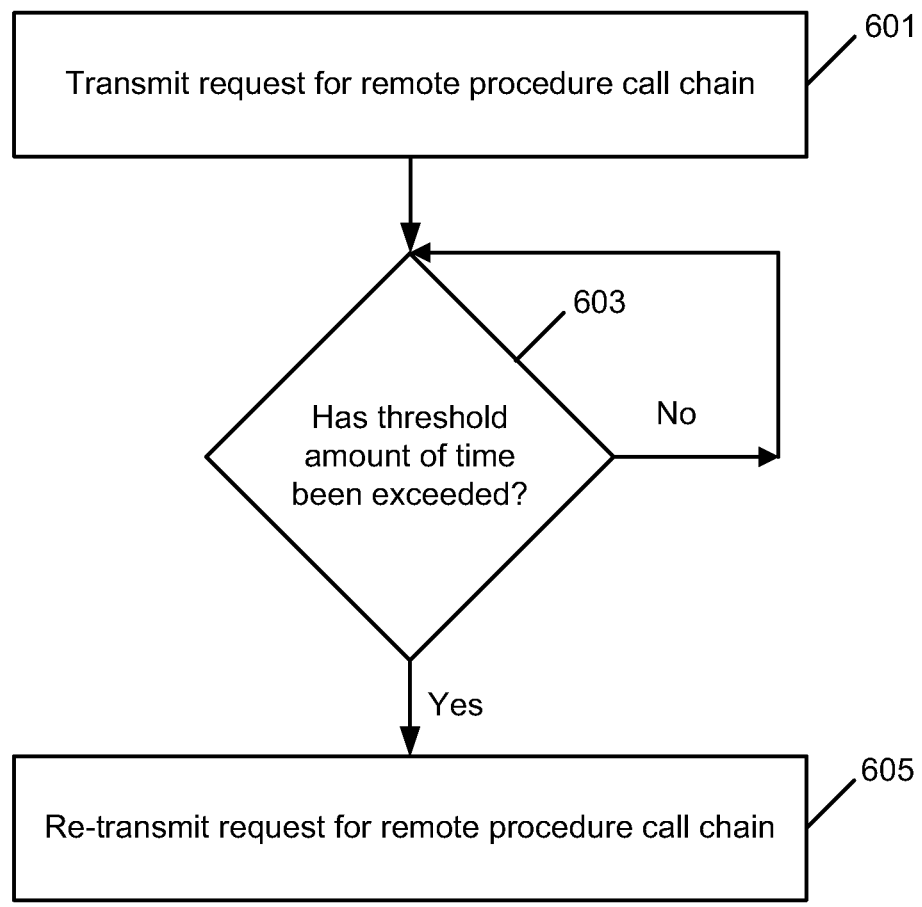
FIG. 6 is an operational flow of an implementation of a method for determining if a remote procedure call chain has executed.

FIG. 6 is an operational flow of an implementation of a method 600 for determining if a remote procedure call chain has executed. The method 600 may be implemented by the remote procedure call chain monitor 306 of the client 303, for example.

A request for a remote procedure call chain may be transmitted (601). The request for a remote procedure call chain may be transmitted by the client 303 to the server 320c, for example.

A determination may be made as to whether a threshold amount of time has exceeded since the request for the remote procedure call chain has been transmitted (603). The determination may be made by the remote procedure call chain monitor 306 of the client 303. If the threshold amount of time has been exceeded, then the request for the remote procedure call chain may be re-transmitted by the client 303 (605). Otherwise, the request for the remote procedure call chain monitor 306 may continue to monitor whether the threshold amount of time has been exceeded (603).

Figure 7:
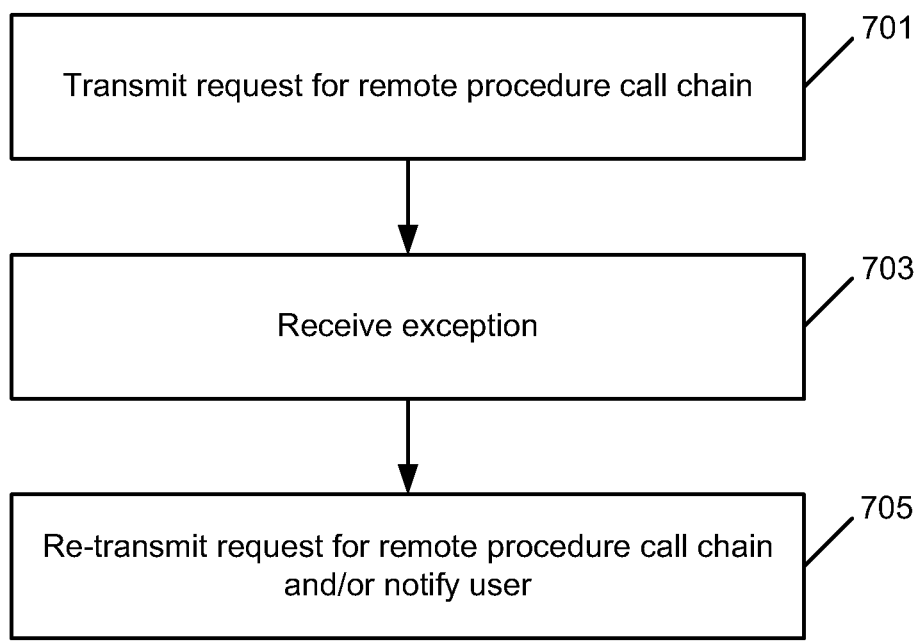
FIG. 7 is an operational flow of an implementation of a method for handling exceptions for a remote procedure call chain.

FIG. 7 is an operational flow of an implementation of a method 700 for handling exceptions for a remote procedure call chain. The method 700 may be implemented by the remote procedure call chain monitor 306 of the client 303, for example.

A request for a remote procedure call chain may be transmitted (701). The request for the remote procedure call chain may be transmitted by the client 303 to the server 320b, for example.

An exception may be received (703). The exception may be received by the remote procedure call chain monitor 306, and may have been generated by a server (e.g., the server 320d) during the execution of the remote procedure call chain. The exception may have been generated because an error was encountered during the execution of the remote procedure call chain.

The request for the remote procedure call chain may be re-transmitted (705). The request for the remote procedure call chain may be re-transmitted by the client 303 in response to receiving the exception.

Figure 8:
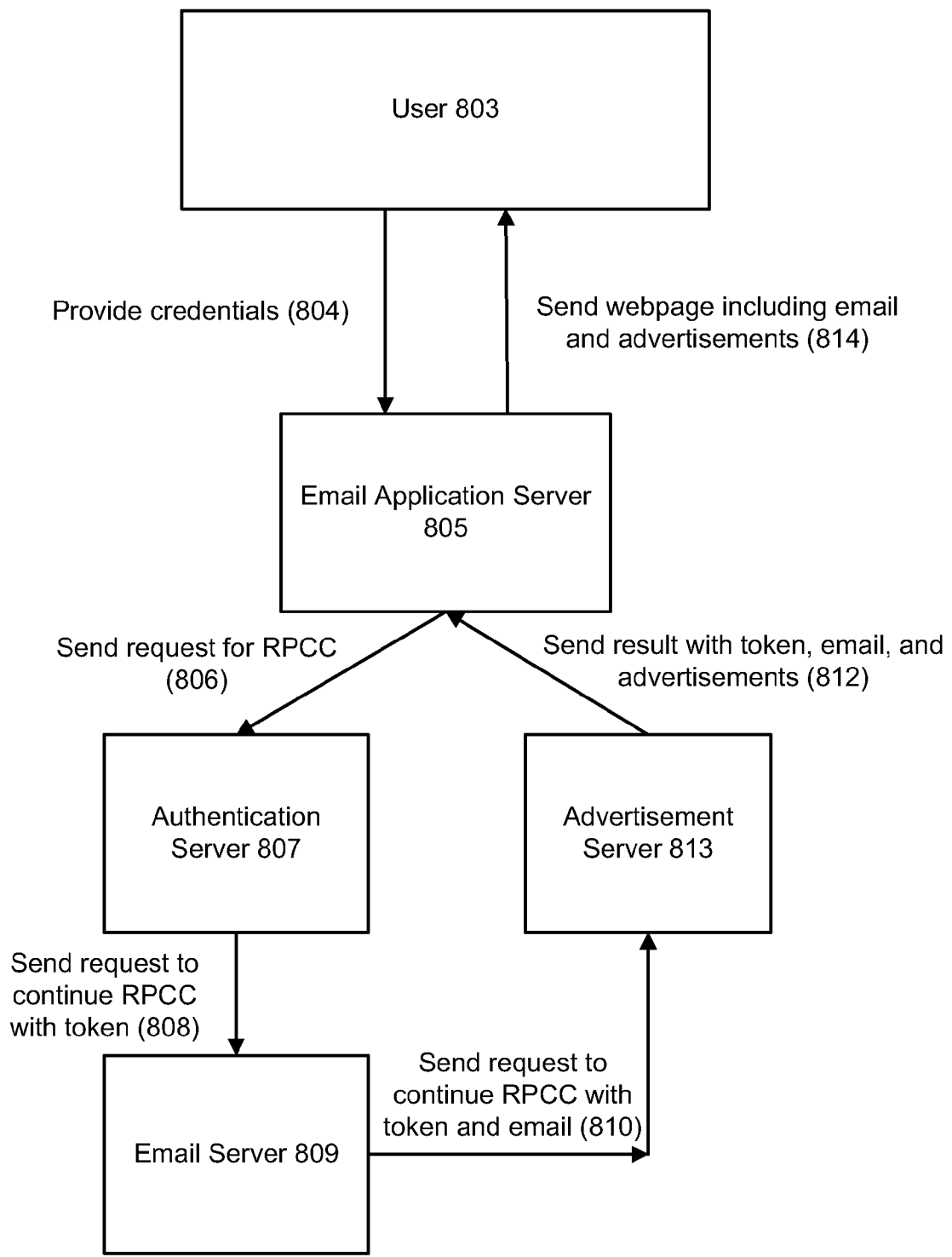
FIG. 8 is an illustration of an example implementation of an online email application system using remote procedure call chains.

FIG. 8 is an illustration of an example implementation of an online email application system 800 using remote procedure call chains. A user 803 may connect to an email application server 805. The email application server 805 may be implementing an online email application such as Hotmail™, for example. The user 803 may log into the email application server 805 by providing credentials to the email application server 805 (804).

Upon receipt of the credentials, the email application server 805 may invoke a remote procedure call chain that results in the authentication of the user using the received credentials, retrieving email messages for the authenticated user, generating advertisements based on the content of the messages, and returning the advertisements and email messages to the email application server 805. The email application server 805 may send a request for the remote procedure call chain to an authentication server 807 (806). The request for the remote procedure call chain may include the credentials provided by the user as parameters for a service function, and some empty state information, for example.

The authentication server 807 may receive the request for the remote procedure call chain and execute a service function using the credentials provided in the parameters. In some implementations, the authentication server 807 may retrieve and compile a chaining function. In other implementations, the compiled chaining function may preexist in a cache of the authentication server.

The authentication server 807 may execute the service function causing the authentication server 807 to retrieve an authentication token for the user. The authentication server 807 may further execute the chaining function using the retrieved authentication token as a parameter to generate the next service function, a next chaining function, parameters containing the authentication token for the next service function, new state information containing the authentication token, and an indicator of the next computing device (the email server 809) to execute the remote service call chain. The authentication server 807 may then send a request to continue the remote procedure call chain including the next service function, next chaining function, parameters containing the authentication token for the next service function and new state information to the email server 809 (808).

The email server 809 may receive the request to continue the remote procedure call chain to retrieve and compile the chaining function, and may execute the service function causing the email server 809 to retrieve email messages for the user using the authentication token. The email server 809 may subsequently execute the chaining function using the state information and retrieved email messages as a parameter to generate a next service function, a next chaining function, parameters including the retrieved email messages and authentication token for the next service function, new state information containing the retrieved email messages as well as the authentication token, and an indicator of the next computing device (the advertisement server 813) to execute the remote procedure call chain. The email server 809 may then send a request to continue the remote procedure call chain including the next service function, next chaining function, parameters for the next service function, and new state information to the advertisement server 813 (810).

The advertisement server 813 may receive the request to continue the remote procedure call chain, retrieve and compile the chaining function, and execute the service function causing the advertisement server 813 to generate advertisements based on the retrieved email messages. The advertisement server 813 may further execute the chaining function using the retrieved advertisements as a parameter to generate an indicator of the next computing device (the email application server 805) to send the state information including results of the remote procedure call chain. The advertisement server 813 may then send the state information including the authentication token, email messages, and generated advertisements to the email application server 805 (812).

The email application server 805 may receive the authentication token, email messages, and generated advertisements as the results of the remote procedure call chain. The email application server 805 may then package the generated advertisements and email messages in a webpage and transmit the webpage to the user 803 (814).

Figure 9:
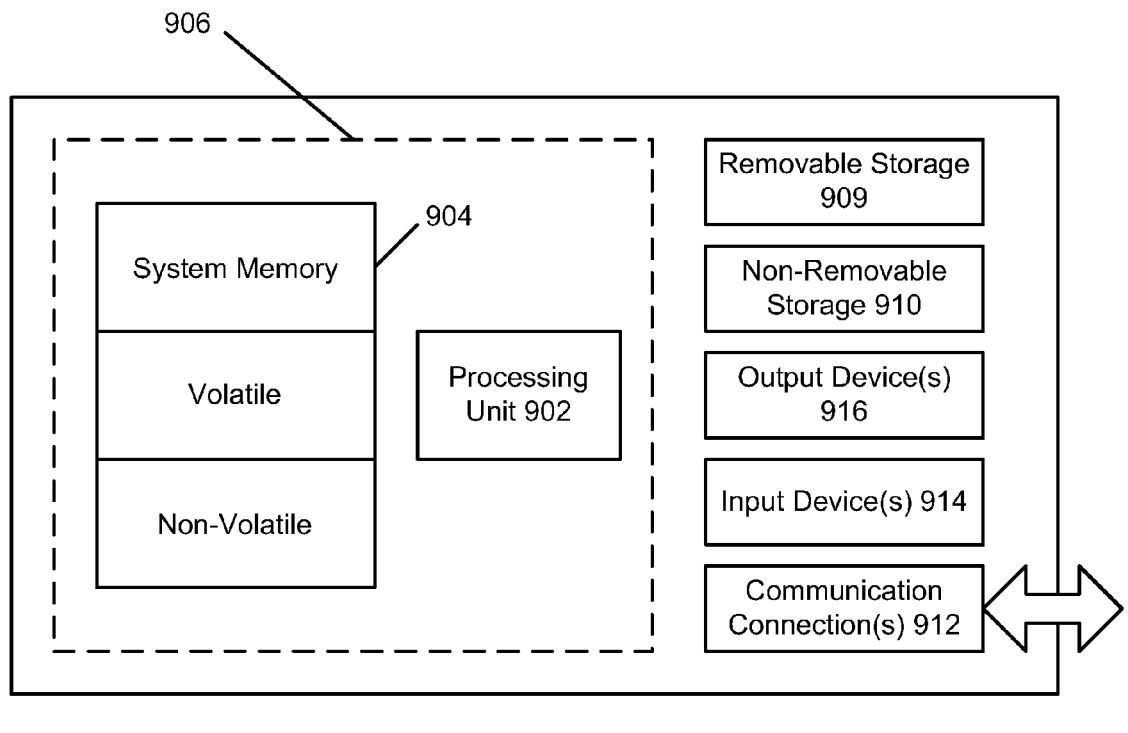
FIG. 9 is an illustration of an exemplary computing environment.

FIG. 9 is an illustration of an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by device 900 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

Computing device 900 may be one of a plurality of computing devices 900 inter-connected by a network. As may be appreciated, the network may be any appropriate network, each computing device 900 may be connected thereto by way of communication connection(s) 912 in any appropriate manner, and each computing device 900 may communicate with one or more of the other computing devices 900 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for remote procedure call chaining, comprising:
    generating a remote procedure call chain comprising a first service function, first chaining instructions, and a plurality of parameters for the first service function at a first computing device;
    transmitting the remote procedure call chain to a second computing device; and
    executing the remote procedure call chain by the second computing device by:
        executing the first service function using the parameters for the first service function to generate results of the first service function at the second computing device;
        compiling the first chaining instructions at the second computing device using a remote procedure call chain library stored at the second computing device;
        using the compiled first chaining instructions to generate a second service function, second chaining instructions, a plurality of parameters for the second service function, and an identifier of a third computing device at the second computing device;
        transmitting the second service function, second chaining instructions, and the plurality of parameters for the second service function to the third computing device; and
        receiving, at the first computing device, a plurality of results, said results transmitted to the first computing device directly from the last computing device executing instructions from the remote procedure call chain.

2. The method of claim 1, wherein the results received at the first computing device are a function of the first service function and the second service function.

3. The method of claim 1, wherein the first chaining instructions comprise a first chaining function and the second chaining instructions comprise a second chaining function.

4. The method of claim 3, wherein the first chaining function and the second chaining function generate state information.

5. The method of claim 3, wherein the first chaining function is a first chaining function identifier and the second chaining function is a second chaining function identifier, and a remote procedure call chain repository stores a code for the first chaining function identifier and a code for the second chaining function identifier.

6. The method of claim 1, further comprising storing the compiled first chaining instructions and the results of the first service function along with a unique identifier of the remote procedure call chain in a cache of the second computing device.

7. A system for remote procedure call chaining, comprising:
    a first computing device that:
        generates a remote procedure call chain comprising a first service function, a first chaining function, and parameters for the first service function; and
        transmits the remote procedure call chain to a second computing device; and
    the second computing device that:
        receives the remote procedure call chain; and
        executes the remote procedure call chain by:
            generating, using the first service function and the parameters for the first service function, results of the first service function;
            compiling the first chaining function using a remote procedure call chain library stored at the second computing device;
            generating, using the compiled first chaining function and the state information, a second service function, a second chaining function, parameters for the second service function, D an identifier of a third computing device, and new state information; and
            transmitting the second service function, the second chaining function, the parameters for the second service function, and the new state information to the third computing device,
    wherein the first computing device receives a plurality of results, said results transmitted to the first computing device directly from the last computing device executing instructions from the remote procedure call chain.

8. The system of claim 7, wherein the third computing device:
    generates, using the second service function and the parameters for the second service function, results of the second service function;
    generates, using the second chaining function and the new state information, an identifier of the first computing device; and
    transmits the results of the second service function to the first computing device.

9. The system of claim 8, wherein the first computing device further:
    receives an exception from the second computing device or the third computing device; and
    re-transmits the remote procedure call chain in response to receiving the exception from the second computing device or the third computing device.

10. The system of claim 8, wherein the first computing device further:
    determines if a threshold amount of time has been exceeded since transmitting the remote procedure call chain to the second computing device, and if so, re-transmits the remote procedure call chain to the second computing device.

11. The system of claim 7, wherein the first chaining function depends on the results of the first service function.

12. The system of claim 7, wherein the results of the first chaining function include debugging information.

13. The system of claim 7, wherein the second computing device is an email server.

14. The system of claim 7, wherein the third computing device is an advertisement server.

15. A method for using a remote procedure call chain, comprising:
- receiving a remote procedure call chain comprising a first chaining function, a first service function, state information, and parameters for the first chaining function at a first computing device;
- executing the remote procedure call chain by the first computing device by:
  - generating results of the first service function at the first computing device using the first service function and the parameters for the first service function;
  - compiling the first chaining function at the first computing device using a remote procedure call chain library stored at the first computing device;
  - generating a second service function, a second chaining function, parameters for the second chaining function, new state information, and an identifier of a second computing device at the first computing device using the compiled first chaining function, the state information, and the results of the first service function; and
  - transmitting the second service function, the second chaining function, the new state information, and the parameters for the second service function to the second computing device from the first computing device;
  - receiving the second service function, the second chaining function, the new state information, and the parameters for the second service function at the second computing device;
  - generating results of the second service function at the second computing device using the second service function and the parameters for the second service function;
  - generating an identifier of a third computing device at the second computing device using the second chaining function and the new state information; and
  - transmitting the results of the second service function to the identified third computing device from the second computing device,
  - wherein the first computing device receives a plurality of results, said results transmitted to the first computing device directly from the last computing device executing instructions from the remote procedure call chain.

16. The method of claim 15, further comprising transmitting the remote procedure call chain from the third computing device to the first computing device.

17. The method of claim 15, wherein the first chaining function is an identifier of the first chaining function.

18. The method of claim 15, wherein the second and third computing devices are the same computing devices.

19. The method of claim 15, wherein the first service function is stored at the first computing device.

* * * * *